(12) United States Patent
Gianazza et al.

(10) Patent No.: US 9,068,781 B2
(45) Date of Patent: Jun. 30, 2015

(54) TUBE BUNDLE EQUIPMENT WITH LIQUID FLOW REGULATOR ELEMENTS

(75) Inventors: Alessandro Gianazza, Legnano (IT); Lino Carlessi, Dalmine (IT)

(73) Assignee: SAIPEM S.p.A., San Donato Milanese (IT)

( * ) Notice: Subject to any disclaimer, the term of this patent is extended or adjusted under 35 U.S.C. 154(b) by 781 days.

(21) Appl. No.: 13/318,793

(22) PCT Filed: Apr. 27, 2010

(86) PCT No.: PCT/IB2010/000961
§ 371 (c)(1),
(2), (4) Date: Jan. 12, 2012

(87) PCT Pub. No.: WO2010/128371
PCT Pub. Date: Nov. 11, 2010

(65) Prior Publication Data
US 2012/0097378 A1    Apr. 26, 2012

(30) Foreign Application Priority Data

May 6, 2009  (IT) .............................. MI2009A0768

(51) Int. Cl.
*F28F 25/06* (2006.01)
*F28D 3/02* (2006.01)
(Continued)

(52) U.S. Cl.
CPC .. *F28D 3/02* (2013.01); *F28D 3/04* (2013.01); *B01J 19/2425* (2013.01); *Y10T 29/49391* (2015.01); *F28F 19/06* (2013.01); *F28F 25/06* (2013.01)

(58) Field of Classification Search
CPC .............. F28F 19/06; F28F 25/06; F28D 3/04
USPC ...................... 165/118, 133, 180, 905; 277/45
See application file for complete search history.

(56) References Cited

U.S. PATENT DOCUMENTS 2,498,752 A * 2/1950 Copeland ...................... 165/118
3,016,067 A * 1/1962 Edmonds ........................ 138/38
(Continued)

FOREIGN PATENT DOCUMENTS

EP    1 491 836    12/2004
GB     946 796     1/1964
(Continued)

OTHER PUBLICATIONS

U.S. Appl. No. 13/003,988, filed Jan. 13, 2011, Sanfilippo, et al.
(Continued)

*Primary Examiner* — Allen Flanigan
(74) *Attorney, Agent, or Firm* — Oblon, McClelland, Maier & Neustadt, L.L.P.

(57) ABSTRACT

Tube-bundle equipment of the falling liquid film type, comprising a vertical cylindrical body closed at the ends and divided into at least an upper section, an intermediate section and a lower section by means of two perforated tube sheets arranged transversally to support the tubes forming the bundle, wherein each of said tubes is surmounted, on the upper end, by a ferrule, for the inlet and distribution of the liquid in the form of a film, which comprises in the upper part, one or more openings for the outlet of vapors, at an intermediate height one or more openings, preferably tangential, for the inlet of the liquid and below, a circular base for resting on said tube from which an internal cylindrical section, inserted in the tube for a length varying from 10 to 200 mm, protrudes downwards together with an outer metallic strip for a length of at least 2 mm, so that, in the circular area defined between said outer metallic strip and said protruding cylindrical section, there is a gasket, inserted between said circular base of the ferrule and said upper edge of the tube.

27 Claims, 5 Drawing Sheets

Figure 1:
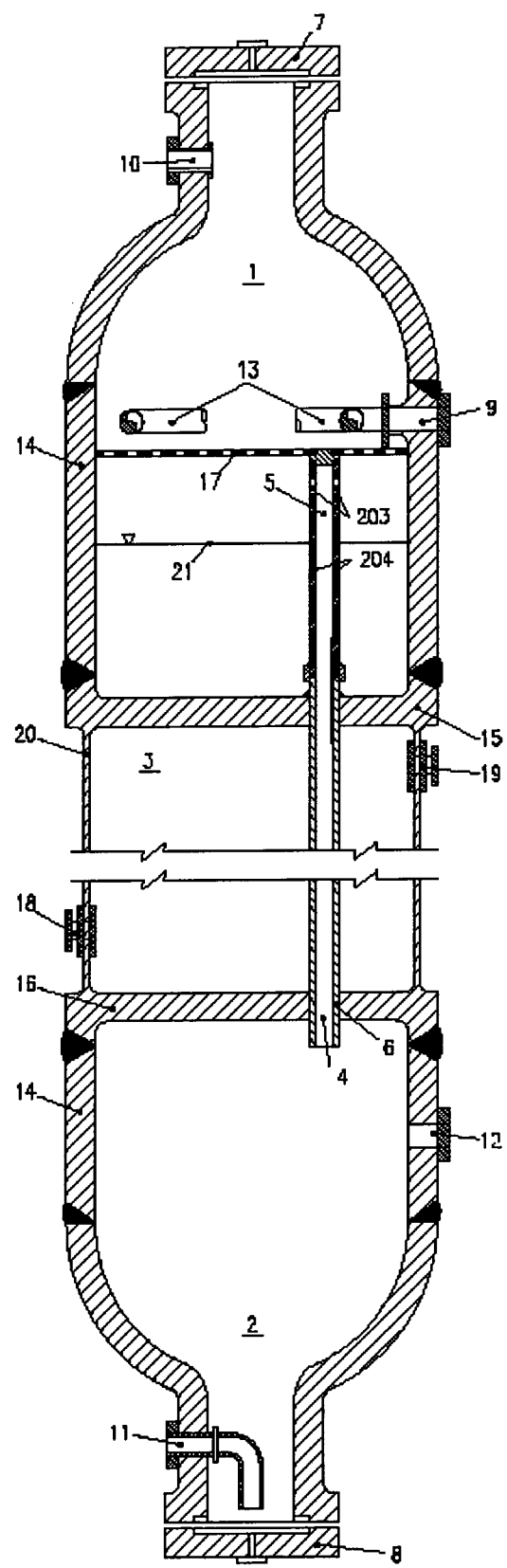

(51) Int. Cl.
*F28D 3/04* (2006.01)
*B01J 19/24* (2006.01)
*F28F 19/06* (2006.01)

(56) References Cited

U.S. PATENT DOCUMENTS

| | | | | |
|---|---|---|---|---|
| 4,154,642 A | * | 5/1979 | Mattern et al. | 159/13.2 |
| 4,248,296 A | * | 2/1981 | Jezek | 165/118 |
| 4,317,787 A | * | 3/1982 | Lagana' | 261/112.1 |
| 5,054,547 A | * | 10/1991 | Shipley | 165/115 |
| 5,314,209 A | * | 5/1994 | Kuhne | 285/45 |
| 2006/0032620 A1 | | 2/2006 | Gandolfi et al. | |
| 2007/0235171 A1 | * | 10/2007 | Romiti | 165/145 |
| 2007/0272298 A1 | * | 11/2007 | Porscha | 137/1 |
| 2008/0093064 A1 | * | 4/2008 | Gianazza et al. | 165/180 |

FOREIGN PATENT DOCUMENTS

| | | | |
|---|---|---|---|
| GB | 1 497 335 | 1/1978 | |
| GB | 2 077 121 | 12/1981 | |
| JP | 05288293 A * | 11/1993 | F16L 41/08 |
| WO | 03 095060 | 11/2003 | |
| WO | 2006 085792 | 8/2006 | |

OTHER PUBLICATIONS

International Search Report Issued Dec. 2, 2010 in PCT/IB10/000961 Filed Apr. 27, 2010.

* cited by examiner

TUBE BUNDLE EQUIPMENT WITH LIQUID FLOW REGULATOR ELEMENTS

The present invention relates to tube bundle equipment comprising metallic regulator elements of the liquid flow.

More specifically, the present invention relates to tube bundle equipment of the vertical type, suitable for effecting heat exchange between two fluids, one of which, in the liquid state, falls along the internal walls of the tubes in the form of a film.

Even more in particular, the present invention relates to a tube bundle heat exchanger of the falling liquid film type, suitable for separating gases and vapours from a liquid having highly aggressive properties, equipped with a particular element for the distribution of the liquid film, situated at the head of each tube.

Tube bundle equipment is widely used in the art for efficiently effecting the heat exchange between two fluids, particularly when phase transformations or chemical reactions take place along one or both sides of the exchange wall due to the heat flow. This type of equipment is relatively easy and simple to construct as it normally consists of a cylindrical chamber longitudinally crossed by a plurality of tubes, which are seal-fixed onto two transversal plates (called tube sheets) which delimit, at the two ends of the equipment, demarcated by two heads, two chambers for the collection and distribution respectively of the gases and liquids flowing inside the tubes. The exchanger fluid, often consisting of hot gases coming from a furnace or saturated steam, circulates outside the tubes, in the so-called shell side.

In tube bundle heat exchangers of the vertical falling liquid film type, to which the present invention refers in particular, the tubes are positioned vertically so that a uniform and thin liquid film flows by gravity from above along the wall, thus obtaining an efficient heat exchange with the fluid on the shell side, reducing the contact time as far as possible. At the same time, the vapours possibly formed by evaporation or chemical reaction due to the heating, are easily released through the wide liquid film surface and can be removed along the substantially liquid-free internal duct of the tube. It is consequently essential, for a good functioning of this type of heat exchanger, for the liquid film to be uniformly distributed and that this does not even occasionally form areas of blockage and turbulence mixed with vapours, with consequent obstruction and pressure drops along the tube.

Some methods and equipment generally adopted for effecting heat exchange in these cases are mentioned, for example, in the technical publication "Perry's Chemical Engineering Handbook", McGraw-Hill Book Co., 6$^{th}$ Ed. (1984), pages 11-18. A typical example of this equipment is represented by a stripper inserted in the high-pressure cycle of synthesis processes of urea.

In heat exchangers which handle fluids with highly aggressive properties, at least one of the two surfaces of each tube and tube sheet and at least a part of the internal surface of the heads, are exposed to direct contact with these fluids and consequently these surfaces must consist of or be adequately coated with a protective metallic layer resistant to chemical corrosion or erosion deriving from dynamic phenomena such as, for example, turbulence or gas formation. In many cases, the erosive and corrosive actions interact synergically making the fluid even more aggressive.

The problem of corrosion and/or erosion has been faced with various solutions in existing industrial plants, and others have been proposed in literature. There are in fact numerous metals and alloys capable of resisting, for sufficiently long periods, the extremely aggressive conditions created inside equipment in processes involving fluids having an extremely high corrosiveness, such as for example in the synthesis of nitric acid and urea. Among these metals, lead, titanium, zirconium, tantalum, niobium and their alloys of various grades, can be mentioned, in addition to numerous stainless steels, such as, for example, austenitic stainless steel (AISI 316L steel urea grade), stainless steel of the type 25/22/2 Cr/Ni/Mo, austeno-ferritic stainless steels.

In spite of their higher cost with respect to stainless steels, metals such as titanium and zirconium, due to their high resistance to corrosion and satisfactory mechanical qualities, are frequently preferred for the production of tubes in high-pressure heat exchange equipment used in the synthesis of urea and nitric acid. Zirconium, in particular is known for its excellent resistance to both chemical corrosion and to the erosive action of the process fluids it comes into contact with, whereas titanium has a resistance to corrosion substantially similar to zirconium, but a lower resistance to erosive action.

In the particular case of a tube bundle exchanger of the vertical falling liquid film type, such as, for example the stripper included in the urea synthesis high-pressure loop, the solution to the problems of corrosion is extremely complex due to the particular geometry of the equipment aimed at allowing a distribution of the temperatures and compositions of the fluids as controlled and reproducible as possible, in addition to the high mechanical stress to which the metallic surfaces are subjected in the areas where the thermal decomposition chemical reaction of the ammonium carbamate takes place, which consequently undergo a significant erosive action and must consist of metals having an adequate mechanical resistance. Numerous solutions have been proposed over the years by operators in the field.

U.S. Pat. No. 4,899,813 describes the construction and use of vertical tube bundle equipment especially suitable for the high-pressure stripping operation of the urea solution coming from the synthesis reactor. In order to prevent corrosion in the areas inside the tubes, where the thermal exchange and decomposition of the carbamate take place, and consequently where there is the maximum chemical and erosive aggressiveness of the fluid, a tube bundle consisting of bimetallic tubes is used, i.e. consisting of an external part made of stainless steel, and an internal part, having a finer thickness (0.7-0.9 mm), made of zirconium, which adheres mechanically with the former, but is not welded to it, as the two materials are incompatible with each other to normal melt welding. This solution represented a significant improvement with respect to the known art, but, over long periods of time, it could not prevent problems of corrosion from arising as a result of the infiltration of the corrosive fluid towards the external part of the tube, made of steel.

According to other solutions, there was also the proposal of using tubes made entirely of a high-performance metal, such as zirconium, niobium or tantalum, connected with a coating made of the same material as the walls of the remaining parts of the apparatus exposed to corrosion. The high cost of these solutions, however, limited their wide industrial development.

Patent application EP 1577632 describes a tube bundle exchanger suitable for the treatment of ammonium carbamate in urea synthesis plants, in which the bundle consists of titanium tubes coated with a thin layer of zirconium on the side in contact with the corrosive fluid, and seal-fixed on the titanium coating of the tube sheet by titanium-titanium welding. The zirconium layer does not necessarily extend for the whole length of the tubes, but it can be positioned in the area of the tube subjected to the most intense aggressive attack. Methods for obtaining these tubes can comprise hot welding or forging, to favour the formation of a metallurgic bond between the zirconium layer and surface of the titanium.

Published international patent application WO 06/020381 proposes a different solution to this problem, by the production of a tube bundle with tubes comprising an intermediate metallic tubular element, essentially consisting of a high-performance anti-corrosion metal, which is welded in the solid state, to one or both of the ends, with a second double-layered coaxial tubular element in which one layer is of the same metal as the intermediate element, and the other layer is suitable for welding with the metal of the coating of the tube sheet.

The above vertical falling liquid film heat exchange equipment requires a device for the optimum distribution of the liquid along the walls of the tube and for the contemporaneous discharge of the gases and vapours introduced into the exchanger, preferably from below, as entrainment gas, or products in the tubes themselves following evaporation or thermal decomposition of one or more constituents of the liquid itself. This device, more commonly known with the technical term "ferrule", generally has a tubular form and is wedged onto the end of each tube of the tube bundle, above the supporting tube sheet. Said ferrule can be opened upwards for the outlet of the gases or vapours, or, it can be closed at the upper end by means of a head which can also act as a rest for a possible fixing grid, as specified further on, in which case the gases or vapours are discharged through one or more side holes situated in the side wall of the ferrule, close to its upper end. One or more holes are positioned tangentially in the wall of the ferrule slightly above the rest base on the end of the tube, to allow the inlet and uniform distribution of the liquid on the internal walls. Furthermore, each ferrule comprises a lower end, extending beyond the rest base, shaped so as to be correspondingly inserted in the upper opening of each tube of the exchanger. A fixing grid is usually rested on the upper part of the group of ferrules inserted in the tube bundle in order to keep the ferrules firmly inserted in the tubes, opposing the force of the rising vapours.

Devices of the type described above are applied industrially on vertical falling liquid exchangers in various fields. An interesting description of the ferrule used so far in many strippers of the urea synthesis process is provided in the article of S. R. Ghosh published in: Fertilizer News, June 1994, pages 57-65.

Ferrules of the type described are used, for example, in both the decomposer/stripper of the high-pressure urea synthesis cycle, and in the subsequent equipment for the decomposition of the ammonium carbamate at medium or low pressure of the same plant, when these are of the falling film type. A sectional view of a typical ferrule used in high-pressure strippers for the synthesis of urea is schematically represented in the following FIG. 2.

Figure 2:
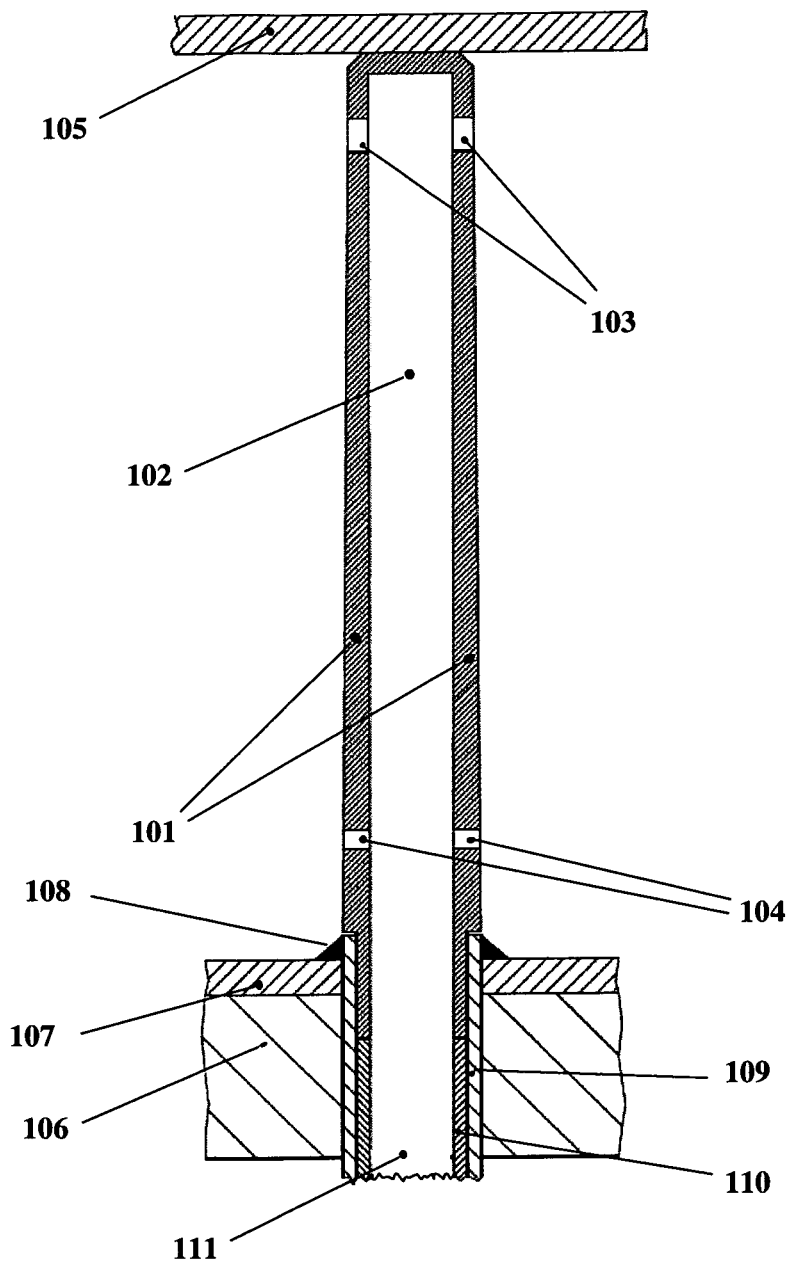

Although the use of the above ferrules has been known for long time, some of the drawbacks have not yet been satisfactorily overcome. One of the main problems, in fact, remains the infiltration of liquid with a corrosive and erosive action through the rest and insertion area of the ferrule on the upper end of the tube. Due to its function as a removable device, in fact, the ferrule is not welded onto the tube, but simply rests on it, exploiting the wedge-insertion of its lower part in the tube cavity, as a positioning and sealing element. Due to the vibrations of the equipment during use, however, and under the stress of the high-temperature fluids, having a highly corrosive and erosive action, infiltrations are produced with time which progressively damage the surfaces with which they come into contact, finally producing serious deformation phenomena of the upper end of the tubes and significant losses of liquid which enters the tube in a non-tangential direction and in an unarranged position, thus preventing the uniform formation of the falling film along the wall and creating further risks of erosion and corrosion of the metallic walls. In an attempt to prolong the duration of the equipment, grids have been used, which rest on the upper ends of the ferrules, possibly provided with holes or housings for blocking the ferrules, as shown in FIG. 2 enclosed herewith and in the above-mentioned article of Ghosh. This solution has also proved to be unsatisfactory, however, as it is not able to sufficiently reduce the infiltration in the interstices present between the ferrule and tube end, due to both the inevitable deformation of the grid and tube end, and also as a result of the unequal height of the upper terminations of the ferrules with respect to the perfect coplanarity, which allows small shifts of the same, above all in the start-up and shut-down phases of the plant, and consequent infiltrations of liquid.

In its activity for continuously improving its technology, the Applicant has now found a particular configuration of the tube and superimposed ferrule, which provides an adequate solution to the above requirements and problems connected therewith, especially in relation to tube bundle equipment with tubes comprising an anticorrosive material different from stainless steel, such as the above-mentioned Zr or Ti.

A first object of the present invention therefore relates to tube bundle equipment of the falling liquid film type, suitable for thermal exchange between fluids, comprising a vertical cylindrical body closed at the ends and divided into at least one upper section, an intermediate section and a lower section by means of two perforated tube sheets arranged transversally at a suitable distance from each other, wherein a plurality of tubes are arranged longitudinally forming a tube-bundle and seal-inserted with the respective ends in the holes of said tube sheets allowing said upper section and lower section of the cylindrical body to be in fluid communication with each other, each tube being surmounted, on the upper end, by a tubular device, also called ferrule, for the inlet and distribution of the liquid in the form of a film along the wall of the same, said tubular device comprising above one or more openings for the outlet of vapours, at an intermediate height one or more openings, preferably tangential, for the inlet of the liquid and below, a circular base for holding on the upper end of said tube and a lower cylindrical section protruding downwards beyond the circular base, inserted in said tube for a length varying from 10 to 200 mm and preferably having the external diameter substantially coinciding with the internal diameter of the tubular element, characterized in that said ferrule comprises a further metallic strip arranged laterally with respect to the outside of said circular base and protruding downwards beyond this for a length of at least 2 mm, preferably from 3 to 50 mm, and in that, in the circular area defined between said outer metallic strip and said cylindrical, section protruding downwards, there is a gasket, inserted between said circular base of the ferrule and said upper end of the tube.

A second object of the present invention relates to a method for the production of the above tube bundle equipment, which comprises arranging two perforated tube sheets inside a cylindrical shell equipped at the two ends with two terminal heads, so that each tube sheet is situated close to a head, inserting and seal-fixing in the holes situated in each tube sheet, a plurality of tubes extending orthogonally towards the plane of the tube sheet, for the whole distance which separates them, in order to put the spaces between each tube shhet and the corresponding head in fluid connection with each other, positioning on the upper end of each of said tubes, a ferrule comprising, in the upper area, one or more openings for the outlet of vapours, at an intermediate height, one or more openings, preferably tangential, for the inlet of the liquid and in the lower area, a circular base for resting said tube on the upper border and a cylindrical section protruding downwards beyond the circular base, inserted in said tube for a length varying from 10 to 200 mm and having the outer diameter substantially coinciding with the internal diameter of the same, characterized in that said ferrule comprises a further metallic strip arranged laterally with respect to the outside of said circular base and protruding downwards beyond this for a length of at least 2 mm, preferably from 3 to 50 mm, and in that, in the circular area defined between said outer metallic strip and said cylindrical section protruding downwards, an annular gasket is inserted, which acts as a support between said circular base of the ferrule and said upper end of the tube.

Other objects of the present invention will appear evident in the following present description and following claims.

The term "alloy" as used herein with reference to a certain metal, refers to a metallic composition comprising said metal in a quantity of at least 50% by weight.

Unless otherwise specified hereunder, every reference to a metal also includes its respective alloys.

The terms "corrosion" and "corrosiveness" as used in the present description and claims with reference to the action of a process fluid in contact with a surface of a certain metal or alloy, is intended in its general meaning of removal or modification of the properties of the material forming the surface and comprises both the corrosive action deriving from a chemical attack of the surface, and also the erosive action deriving from a physical removal process due to impact, friction and shear forces.

In accordance with the present description, the term "corrosion resistant" referring to a material with respect to a fluid under certain process conditions, defines a material which has a corrosion index lower than 0.1 mm/year measured according to the regulation ASTM A 262 file C (HUEY TEST). Corrosion indexes for materials for normal industrial use are indicated in various manuals known to experts in the field, such as, for example, in Tables 23-22 to 23-24 of the abovementioned "Perry's Chemical Engineering Handbook", under the item "Ammonium Carbamate".

The term "force-welding" and "seal-welding", as used in the present description and claims, refers to the following definitions taken from the regulation ASME VIII Div.1 UW20:
  a force-welding is a welding with characteristics which are such as to satisfy the project requirements, on the basis of the mechanical characteristics and stress deriving from the expansion of the welded parts;
  a seal-welding is effected with the aim of avoiding losses and its dimensions are not determined on the basis of the loads previously expressed for force-welding.

The term "metallurgically bound", as used herein with reference to the interaction between two metallic bodies joined to each other (such as, for example, any two bodies selected from a tube, a metallic coating, a plate or force body), indicates the presence of a contact surface or section between said metallic bodies, in which the respective constituents (which can be the same metal or different metals) are joined directly or indirectly with each other so as to form a joint with characteristics of mechanical and release resistance in the same order of magnitude as at least one of said metals. Examples of metallurgically bound bodies are those in which the respective metals are joined by melt welding, with or without a fusible rod, brazing, friction welding, explosion welding, co-extrusion, hot drawing and analogous techniques.

The terms "high" and "low" or their analogues and derivatives, such as "upper" and "lower", when used in relation to falling liquid heat exchangers or their parts, including the equipment object of the present invention, refer to the vertical apparatus, as positioned when in use.

The terms "circular" and "diameter" as used herein with reference to the equipment claimed or its parts, such as tubes and ferrules, are not in any way intended as limiting the parts described to a cylindrical geometry, but are extended, by analogy, to different forms of closed geometries, for example elliptic or quadrangular.

The vertical heat exchange equipment according to the present invention (for greater convenience also defined hereinafter as vertical heat exchanger) does not differ, in its basic elements, from the characteristics of typical falling film exchangers known in the art. It usually has a cylindrical shape, with a diameter preferably varying from 0.5 to 3.0 m, closed at the ends by two heads, normally semispherical to for better sustaining the pressure thrusts, which usually also enclose part of the volume of the two upper and lower sections, destined for the distribution and collection respectively of the liquid subjected to heat treatment, whereas the intermediate or central section of the apparatus, delimited by the respective upper and lower tube sheets, comprises the tube bundle which puts said distribution and collection chambers, and the space, also called shell, where the fluid circulates for supplying heat, in fluid communication. In the semispherical heads and along the cylindrical body there are suitable openings for the inlet and outlet of the fluids, the introduction of possible sensors and an opening for inspections (manhole). When in operating position, the equipment is vertically oriented, for example when used as a stripper of the urea synthesis process.

If the vertical heat exchanger of the present invention is destined for use under medium-high pressure and temperature conditions, and in the presence of particularly aggressive fluids, as is the case, for example, in the recovery of non-reacted carbamate in urea production processes, or in the concentration of nitric acid, the expert in the field carefully selects the most suitable metallic materials for resisting the corrosion and erosion phenomena which can take place, and dimensions the various parts of the equipment, in particular the thickness of the tubes of the tube bundle, the tube sheet and external wall of the apparatus (also called pressure resistant body), so that they can sustain the pressure thrust, guaranteeing high safety conditions. The pressure resistant body in particular has thicknesses normally ranging from 20 to 400 mm, higher for the walls of the head and thinner for the cylindrical wall of the shell. Typically, the central cylindrical area, in contact with the saturated vapour at pressures of 0.2 to 5 MPa, preferably has thicknesses varying from 20 to 100 mm, whereas the wall of the heads and cylinder close to these, subjected to the greater pressure of the process fluids, has proportionally higher thicknesses, preferably ranging from 80 to 300 mm. The outer wall can consist of a single layer or various layers of carbon steel assembled according to any of the known techniques. An expert in the field will also carefully assemble and weld the various parts so that there are no losses due to imperfections, according to the methods known in the art.

The interior of the apparatus is marked by the area comprising the tubes of the tube bundle, normally grouped parallel to each other, fixed on the two tube sheets, suitably positioned transversally to the main axis of the equipment, and also comprising a flat element suitable for tolerating the pressure difference, normally made of carbon steel, with a thickness ranging from 20 to 500 mm. In the most common case, the two tube sheets are each situated close to one of the two heads and define an intermediate section having an essentially cylindrical geometry. Each tube sheet is seal- and force-fixed onto the circular wall by welding, so that there can be no exchanges of material between adjacent sections.

The tubes cross the two tube sheets, which are suitably perforated for this reason, enabling the passage of a fluid between the upper and lower sections situated at the end of the tubes. A stream of a second fluid, normally saturated steam at the necessary pressure for supplying heat at the desired temperature, is introduced into the intermediate cavity, normally on the shell side, to effect the heat exchange through the wall of the tubes, and removed in the form of a condensate through suitable outlet ducts.

There is a variable number of said tubes depending on the project specifications, but it normally ranges from a minimum of 2 to about 10,000 for the largest equipment. Intermediate septa with a thickness of a few millimeters, usually made of carbon steel or stainless steel (also called baffles) can be arranged in the intermediate section in support of the tubes.

According to the present invention, each tube surmounted by the ferrule preferably consists of a material having a high resistance to corrosion, possibly combined with erosion deriving from the mechanical action of the fluids during the evaporation phase inside the tube. This mechanical action is particularly high on the walls of the vertical tubes where the liquid is rapidly heated and vaporizes with a high shear stress on the surface. Materials particularly suitable for the production of these tubular elements are zirconium and niobium, especially zirconium and its alloys comprising at least 60% of Zr, such as Zircalloy© and Zircadyne©, due to the excellent resistance to both corrosion and erosion, and satisfactory commercial availability. Other preferred materials for their high resistance to corrosion are titanium and its alloys and the alloys of stainless steel, especially those developed commercially to resist contact with high-temperature solutions of ammonium carbamate, such as INOX urea grade, Cr/Ni/Mo 25/22/2, austeno-ferritic stainless steels.

Also suitable for the purposes of the present invention are zirconium/stainless steel bimetallic tubes of the type described in the above-mentioned patent U.S. Pat. No. 4,899,813, with the advantage, in the case of the present invention, that the positioning of the ferrule on the tube does not require the removal of the zirconium layer in the terminal part of the tube for a length of 30 to 100 mm, as was necessary, on the other hand, in the solutions so far proposed in the art. The embodiment of the exchanger according to the present invention has proved to be equally advantageous, if the tube is of the type described in the above-mentioned international patent application WO 06/020381, or in the published patent application US 2008/093064, whose upper part consists of zirconium or an internal layer of zirconium or one of its alloys, metallurgically bound to an outer layer of titanium or one of its alloys. Also in this case, in fact, the combination of elements characterizing the present invention avoids further processing at the tube end during the production of the equipment.

As a result of its numerous applications, and depending on its construction materials, the dimensions of the tube of the present equipment can vary within wide limits. For an optimum performance in the presence of a high pressure differential, usually ranging from 2 to 30 MPa, between the outer surface (shell side, in contact with a thermal fluid, normally with vapour at low, medium or high pressure) and the internal surface (in contact with the corrosive and/or erosive fluid), the internal diameter of the tube ranges from 5 to 150 mm, preferably from 10 to 100 mm, and the thickness preferably varies within a range of 1 to 20 mm, more preferably from 2 to 15 mm. Although the tubes are normally cylindrically shaped, tubes having different sections, for example elliptical or square are not excluded from the scope of the present invention.

In accordance with the present invention, the length of the tube in the tube bundle can vary within wide limits, in relation to the dimensions of the equipment where it is used. The length is generally at least 5 times higher than the diameter and preferably varies from 1 to 20 meters, more preferably from 2 to 15 meters. In the most common case, the length of the tubes defines the length of the tube bundle and the distance between the tube sheets.

According to the present invention, the end of each tube, in particular the upper end, is conveniently seal-welded with the coating of the tube sheet. This welding can be effected in various ways included in the scope of the present invention, depending on the composition of the tubes and tube sheet and use of the equipment. If the tube sheet is coated with titanium or zirconium, and the terminal part of the tube consists of at least one layer compatible with the welding with said metal or its alloy, it is preferable to seal-weld, and possibly also force-weld, the coating with said compatible layer. The same type of embodiment is possible when, for example, both the coating and the outer wall of the tube consist of a stainless steel. Said welding, if also effected as force-welding, also forms the fixing area of the tube onto the tube sheet, resistant to the mechanical stress deriving from the pressure differential. Other solutions for fixing the tube onto the tube sheet can be easily found by experts in the field on the basis of what is known in the art.

According to the present invention, the upper edge of the tubes of the tube bundle conveniently protrudes up to 80 mm, preferably from 10 to 50 mm beyond the plane of the tube sheet in which it is inserted. In this case, the welding of the tube to the coating or in any case to the body of the tube sheet is effected around the outer surface of the same tube.

The ferrule situated on the tube end in the exchanger according to the present invention is a tubular-shaped device coherent with the tube itself, whose main functions are, on the one hand, to allow the entrance of the liquid into the vertical tube so that is distributed by falling as uniformly as possible on the walls of the same forming a thin layer (falling film), and on the other, to allow, in a higher point with respect to the former, the outlet of the gases and vapours which are rising in the vertical tube of the bundle, thus preventing blockages and the formation of bubbles or foam which could reduce the functionality of the exchanger, also causing undesired pressure drops.

For this purpose, the ferrule is inserted in the cavity of the vertical tube by means of its own cylindrical section protruding below, having an external diameter substantially coinciding, except for a tolerance of a few μm, with that inside the tube.

According to the present invention, said ferrule extends for a sufficient length for allowing the distancing between the inlet openings of the liquid and those for the exit of the gases and vapours. The length of the ferrule generally ranges from 200 to 800 mm, preferably from 300 to 600 mm, from the edge of the upper end to the margin of the extension of the lower section inserted in the cavity of the tube.

Said lower section of the ferrule comprises a tubular section having a length preferably ranging from to 120 mm, more preferably from 20 to 80 mm, extending below beyond the edge of the circular base, whose thickness is reduced with respect to the upper part of the ferrule and whose external diameter essentially coincides with the internal diameter of the tube of the exchanger so that the two walls are substantially wedged inside each other when the ferrule is inserted in the tube, thus ensuring a correct positioning. According to a preferred aspect, said tubular part of the lower section of the ferrule has an external diameter reduced by 1 to 20 mm, preferably from 2 to 15 mm, with respect to the external diameter of the upper part of the ferrule, and with this part forms, on the circular joining line, a profile at a right angle which produces an annular surface arranged horizontally, forming said circular rest base of the ferrule on the end of the tube of the exchanger, interposed by the gasket. According to a further preferred aspect, the thickness of said tubular section is within the range of 0.5 to 5 mm, preferably from 1 to 4 mm, and is truncated-conically tapered in the lower terminal part, preferably for a length of 5 to 50 mm, more preferably from 10 to 30 mm, so as to become progressively reduced and form a substantial continuity, on the lower margin, with the surface of the internal wall of the tube.

Said lower section of the ferrule joins the remaining part of the device, superimposing the tubular profile of its upper part, which preferably has the same internal diameter as the underlying tube, for a coaxial section varying from 10 to 150 mm, preferably from 40 to 100 mm. According to a preferred aspect of the present invention, in correspondence with said connecting area, the internal diameter of the lower section progressively broadens upwards, producing a truncated-conical profile for a length of 5 to 50 mm, preferably from 10 to 30 mm, similar to that described above, but oriented in the opposite direction. In this way, an internal profile of the ferrule is formed with a trapezoidal section as schematically represented in the subsequent FIGS. 3 and 4, in which the internal diameter, for a preferably long section, for a total of 30 to 300 mm, narrows by 1 to 10 mm, preferably 2 to 8 mm. It has been found that the device according to the present invention thus enables the liquid to be fed to an intermediate area of the ferrule whose internal diameter is substantially the same as the vertical tube, so as to provide a larger circular surface and favour the uniform formation of the liquid film. This then flows downwards without significant turbulences thanks to the presence of the tapered truncated-conical area, except for the inevitable thickening due to the narrowing of the internal diameter of the ferrule, corresponding to the thickness of the lower extension inserted in the tube, then returning to run with a flow as laminar as possible on the internal wall of the tube in the tube bundle, where the heating is initiated by thermal exchange with the saturated steam in the shell side.

As already indicated, on the joining line of the lower protruding section and the remaining body of the ferrule, the difference between the outer diameters of the two tubular sections forms a ring arranged horizontally, forming the circular rest base on the end of the tube. According to the present invention, a circular metallic strip is also positioned on the outer surface of the ferrule close to said circular base, said strip protruding downwards, beyond the margin of the base, for a section of at least 2 mm, preferably from 3 to 50 mm, more preferably from 3 to 30 mm, forming a housing respectively delimited by the outer surface of the protruding part of said lower section, said circular base and the internal surface of the extension of said circular strip, inside which a circular gasket is positioned, made of a heat-resistant and chemically inert material, which, resting on the upper end of the underlying tube, ensures the sealing of the ferrule with respect to possible infiltrations of liquid, giving it greater stability and elasticity with respect to the mechanical stress of the equipment when in use. In any case, the downward protrusion of said outer circular strip must be lower than the length of the protruding section of the tube beyond the tube bundle, so as to guarantee that the weight of the ferrule is loaded on the circular gasket.

Said gasket preferably consists of a high-performance compressible material, which must have a high resistance to the chemical attack of the liquid with which it comes into contact, often of a corrosive nature such as ammonium carbamate or nitric acid, and it must be capable of maintaining its mechanical properties, such as an adequate tensile strength and yield strength to avoid permanent deformation, within the temperature range in use, for example from 100 to 250° C., but at the same time having a sufficient elasticity to adapt itself to the surfaces between which it is positioned. Materials suitable for the purpose can be selected by experts in the field from fluorinated polymers, silicon polymers or analogous elastomeric, vulcanized or non-vulcanized materials, having a high chemical and heat resistance, certain metals with characteristics of high malleability and chemical resistance, such as lead, gold, platinum, silver. Typical fluorinated polymers suitable for the purposes of the present invention are, for example, polytetrafluoroethylene (PTFE), commercially available under the trade-names of Teflon®, Algoflon®, Polymist®; perfluoropolyalkylethers such as perfluoropolyethylene oxide (Teflon®, Hyflon®); ethylene-tetrafluoroethylene copolymers; polyvinylidenefluoride (Hylar®); fluorinated elastomers (Tecnoflon®). PTFE, possibly sintered in the desired form, is particularly preferred.

The arrangement of the protruding section of the outer strip allows the gasket to be kept in its housing and avoids its deformation with time, preventing it from losing its functionality. Said gasket preferably has an annular form, with internal and external diameters substantially coinciding with those of the housing where it is positioned, more preferably equal to the corresponding internal and external diameters of the tube on which it rests, and a thickness, in a vertical direction, ranging from 0.5 to 8 mm, more preferably from 1 to 5 mm. The section is preferably quadrangular, so that the gasket is provided with two flat sides which are in conformance with the circular base of the ferrule and with the rest surface on the tube end, respectively.

The equipment according to the present invention thus allows the life cycle of the falling film heat exchangers subjected to high performances, to be significantly prolonged. Unlike the present invention, the above-mentioned article of Ghosh mentions the use of a Teflon ring only in connection with a ferrule of the external type, in which the ring is arranged laterally to the outside of the tube. Under these conditions, the same Ghosh affirms that the resistance to corrosion of the terminal area of the tube is unsatisfactory.

Tangentially to the internal surface of the ferrule of the present equipment, there is at least one opening in the metallic wall, at a suitable height, for the inlet of the falling liquid in the vertical tube. The function of this opening is to distribute the liquid in the form of a film as uniformly as possible on the internal surface of the tube. For this purpose, there are preferably from 3 to 4 circular openings arranged symmetrically at the same height and oriented tangentially to the internal surface of the tube. The diameter of these openings is preferably selected within the range of 1 to 5 mm, on the basis of the fluid-dynamic parameters of the liquid and flow established for the equipment when functioning. The height at which the openings for the liquid inlet are positioned, determines the level of liquid in the upper section of the exchanger, above the tube sheet, and helps to determine the volume of liquid contained (hold-up). As the inside and outside of the ferrule are connected, the level of liquid is generally maintained slightly above the height of said openings, preferably from 100 to 400 mm higher, to provide the necessary hydrostatic thrust. According to the present invention, it is preferable for said openings to be at a height ranging from 50 to 160 mm, preferably from 60 to 100 mm, with respect to the circular base of the ferrule which rests on the tube. In this way, it has been found that the liquid film is more uniformly distributed when it crosses the coupling area of the ferrule on the tube, in which, as previously mentioned, the internal diameter of the ferrule becomes smaller.

In the higher part of the ferrule, close to the upper end, there is at least one opening for the outlet of the gases or vapours rising from the underlying tube. This opening can be simply formed by leaving the duct of the ferrule open above, or, preferably, it is obtained laterally, just under the top, for example 2 to 30 mm below the closing of the upper end of the ferrule, obtained by welding of the same or by a stopper welded or resting thereon. More preferably, there are from two to four openings for the outlet of the gases or vapours, arranged symmetrically around the side surface of the ferrule. The section of this opening, or openings, can have any form and extension, compatibly with the dimensions of the ferrule, but it must be such as to allow the outlet of the gases without creating a significant pressure drop. Said openings are conveniently square or circular, and with a maximum dimension ranging from 2 to 20 mm.

As previously indicated, each ferrule of the equipment according to the present invention is preferably closed at the upper end with a welded lid or stopper, which can be welded or not, to avoid the dripping of the liquid distributed from above directly into the cavity of the ferrule and underlying tube. The stopper is preferably shaped so as to be able to adapt to the corresponding openings in the possible grid situated above in order to fix the same ferrules.

Said grid, together with the other elements of the present invention, forms a further advantageous instrument for fixing the ferrules in the operating position and preventing any possible oscillation or movement, including the mechanical stress induced by the flow of gases, further improving the resistance to possible infiltrations of liquid into the coupling area of the ferrule onto the tube.

The grid consists of a metallic structure made of a material having good mechanical performances and suitably resistant to corrosion, for example titanium and its alloys or stainless steel, which comprises a series of cavities or holes in positions and with such a form as to be able to house the upper end of each of the ferrules positioned on the tubes of the heat exchanger. In the case of ferrules plugged or closed at the end and equipped with side holes for the outlet of the gases, said grid is also equipped with further openings or holes for the passage of the gases towards the highest part of the upper section, consisting of the head, where they are sent towards the outlet line. Preferred thicknesses of the grid according to the present invention range from 2 to 30 mm, more preferably from 5 to 20 mm. Said grid is wedge-rested against the ferrules and blocked by suitable metallic fixing elements, for example metallic sections welded or bolted on one side on the grid and on the other on the tube sheet. In order to allow a greater constructive and maintenance simplicity, said grid is preferably divided into sections having a suitable dimension for passage through the manhole, which are then assembled among each other at the moment of fixing inside the apparatus.

The particular form of the ferrules according to the present invention allows the same to be inserted on the upper inlet end of each tube, without having to resort to any particular metallurgical processing and without removing any internal layer of the tube itself to be able to house the lower section of the ferrule. The positioning of the sealing ferrule is in fact now ensured directly on the terminal border of the tube by the gasket present in the housing obtained at the circular base by the ferrule as previously described.

The tube bundle equipment of the present invention can be produced with the usual methods adopted for analogous mechanical constructions. An expert in the field designs the construction on the basis of the structure as defined above, taking in account the final use of the equipment and project specifications.

In accordance with this, the method for the production of the tube bundle equipment according to the present invention, especially suitable for effecting thermal exchanges between fluids under high erosion or corrosion conditions, comprises the production of a hollow body equipped with an outer casing, or force body, suitable for tolerating the operating pressures, and the formation, inside said hollow body, of at least one upper hollow section and a lower hollow section, separated by an intermediate section, airtight with respect to these, by the interpositioning of two tube sheets, seal hinged onto the force body, on which a series of tubes is inserted, in suitable holes, forming the tube bundle which allows the fluid communication between said lower and upper sections.

The tube sheets and the tubes of the bundle are made of materials suitable for resisting the possible corrosive and erosive actions of the process fluids, in addition to tolerating the pressure thrusts under the operating conditions. The walls which delimit said sections and the tubes in contact with highly aggressive fluids are preferably made of or coated with metals with a high resistance to corrosion, in particular stainless steel urea grade, titanium, zirconium or alloys thereof, in the preferred case of the production of a stripper for the solution of carbamate and urea coming from the synthesis reaction.

In a preferred embodiment of the present invention, said production method comprises the construction of a tube bundle with bimetallic tubes comprising an internal layer of zirconium co-extruded with an outer layer of titanium produced according to WO 06/020381 mentioned above. The tube sheets are coated with titanium on the side exposed to corrosion.

In a second embodiment, the tubes of the bundle are completely made of zirconium and the tube sheet is coated with zirconium.

The production of the anti-corrosive coating of the tube sheet (both lower and upper) and remaining walls of the upper and lower sections, can be effected according to any of the suitable metallurgical techniques known in the art, such as, for example, the laying, on the surface of the main carbon steel layer, of laminar elements made of the pre-selected anti-corrosion metal or alloy, suitably cut and shaped so as to adapt itself to the shape of the surface to be covered. The elements are arranged adjacent to each other and subsequently seal-welded to each other. Grooves, supports, connecting elements and other interventions or products are positioned, especially along the borders to be welded, according to the normal praxis known to experts in the field. Welding methods of metals such as zirconium, titanium and their alloys, although less common than those for the welding of steels, are known and can be easily applied.

A series of holes having adequate dimensions are created on the tube sheet, in which the tubes destined for forming the tube bundle are inserted, care being taken to allow each tube to protrude above for a length of up to 80 mm, preferably from 10 to 50 mm, with respect to the surface of the tube sheet. The wall of each tube is seal- and force-welded to the tube sheet, with different techniques depending on the structure of the tubes and tube sheet. In the case of tubes made entirely of zirconium, these are preferably seal- and force-welded to the coating of the tube sheet made of an analogous material, which will have an adequate thickness, usually from 1 to 10 mm. In the case of bimetallic tubes, it is possible to weld the different layers in a differentiated manner on the coating and on one of the underlying layers, as described, for example, in the above-mentioned patent U.S. Pat. No. 4,899,813, in published European patent application EP 1.503.837 and in Italian patent application IT MI08A001302. In the welding phase, all the interstitial surfaces are preferably protected, as is customary, by an argon atmosphere. Suitable weep-holes for revealing possible losses are situated in the tube sheet and in the pressure resistant body according to the known techniques.

After completing the seal- and force-welding of each tube on the respective tube sheets, a ferrule having the characteristics previously described is assembled on the upper end of each tube, protruding with respect to the surface of the tube sheet for a length of 10 to 50 mm, and inserted in the tube by means of its lower protruding section. Said ferrule, according to a preferred and non-limiting production method, is obtained by means of the following processing steps:

A) preparation of a first tubular segment, consisting of a suitable corrosion-resistant metal according to what is specified above, having a preferred length of 150 to 700 mm, more preferably from 200 to 550 mm, an internal diameter essentially equal to the internal diameter of the tube of the exchanger and external diameter 2 to 30 mm wider, preferably coinciding with the external diameter of the tube itself;

B) insertion in the lower cavity of said first tubular segment, for a length ranging from 10 to 150 mm, preferably from 40 to 100 mm, of a second tubular segment consisting of a corrosion-resistant metal, preferably the same metal as the first tubular segment or a metal compatible with the welding with this, having an external diameter essentially equal to the internal diameter of the first tubular segment, an internal diameter 1 to 10 mm smaller and a length of 20 to 250 mm, preferably from 40 to 200 mm, so that it protrudes beyond the lower border of the first tubular segment for a length ranging from 10 to 200 mm, preferably from 10 to 120 mm, more preferably from 20 to 80 mm, said second tubular segment having been processed at both ends so as to obtain, in the internal cavity of each of these a tapered truncated-conical profile of the surface for a length varying from 5 to 50 mm, preferably from 10 to 30 mm;

C) seal-welding of the lower border of said first tubular segment, preferably previously grooved to favour the welding deposit, according to the known art, with the side wall of said second tubular element, and processing of the welding area to obtain a horizontal base for resting on the tube end;

D) positioning, on the outer side of said first tubular segment, of a tubular metallic strip consisting of a corrosion-resistant metal, preferably the same metal as the first tubular segment or a metal compatible with the welding therewith, having a thickness ranging from 0.5 to 10 mm, preferably from 1 to 5 mm, a length of 5 to 100 mm, preferably from 10 to 80 mm, so that a section of the same strip protrudes downwards for at least 2 mm, preferably from 2 to 50 mm, more preferably for 3 to 30 mm, and welding of the upper border of said strip onto the outer side of the first tubular segment, in order to form a seat suitable for housing a gasket ring between the circular base of the ferrule and the upper border of the support tube;

E) formation, for example by drilling, of at least one horizontal hole in a tangential direction with respect to the internal surface, preferably from three to four holes, arranged symmetrically with respect to the tubular axis, in the wall of said first tubular segment, said tangential hole having a diameter ranging from 1 to 5 mm, at a distance of 50 to 160 mm, preferably from 60 to 100 mm from the lower margin of the tubular segment (corresponding to the circular base of the ferrule).

In said step D), the welding of the outer strip to the first tubular segment is preferably effected at discreet points, sufficient for maintaining it in the desired position for an average time of use of the ferrule (from 2 to 10 years in the urea synthesis process), rather than along the whole circular border of the strip. Furthermore, it can be alternatively substituted by a different joining method, for example by the formation of a metallurgical bond with the friction welding technique.

If a ferrule with the upper end closed is desired, said production method also comprises the seal-insertion or welding of a closing stopper of said upper end and the formation of one or more side holes slightly below the closing for the outlet of gases or vapours when operating.

At the moment of assembly of the ferrule on the tube end, a gasket having the characteristics specified above is inserted in the housing obtained by the above production method of the ferrule.

The equipment according to the present invention is particularly applied in the separation of gases and vapours from a medium or mixture in the liquid state, subjected to heating by heat exchange with a second hotter fluid which can be a gas, liquid or, preferably a saturated vapour, more preferably steam. Said second fluid is passed in the volume forming the shell side of the exchanger, through suitable inlet and outlet lines normally situated on the side of the equipment. The liquid means to be evaporated, on the other hand, is distributed, by means of suitable distributors, in the upper chamber of the exchanger where it is collected forming, under regime conditions, a layer having a level slightly higher than that of the holes for the inlet of the liquid, situated in the ferrule, sufficient for supplying the necessary hydrostatic thrust for obtaining the desired flow.

The heat exchanger according to the present invention allows both the separation of gases and vapours from the falling liquid film inside the tubes, and also the possible formation and separation of gaseous compounds following chemical reactions, as occurs for example in the preferred case in which the present equipment is used as decomposer and stripper of the ammonium carbamate not transformed into urea in the synthesis process of the latter.

The heat exchangers according to the present invention are in fact advantageously used in particular as strippers in the separation of non-reacted carbamate from the urea synthesis mixture. The latter equipment operates at pressures normally ranging from 1 to 40 MPa and temperatures ranging from 70 to 300° C., in the presence of mixtures containing water, ammonia, carbon dioxide and ammonium carbamate which is the condensation product of said compounds according to the reaction:

$$[2\ NH_3 + CO_2 + n\ H_2O \rightarrow NH_4OCONH_2 \cdot n\ H_2O]$$

The operating conditions are preferably a pressure of 12-25 MPa and a temperature of 120 to 240° C.

In the usual industrial plants for the production of urea, to which the present invention refers particularly, the above equipment included in the high or medium pressure sections normally contains volumes ranging from 2,000 to 100,000 liters.

For this purpose, the reaction mixture is sent to a vertical falling film heat exchanger, where the liquid film is heated very efficiently and releases $CO_2$ and gaseous $NH_3$ and steam, under the possible action of a stripping gas, normally fresh $CO_2$ or $NH_3$ introduced from the outside or coming from that present in excess in the mixture leaving the reactor, thus forming a gaseous mixture which rises in each tube in countercurrent with respect to the liquid and is collected in the same upper chamber of the exchanger where the liquid mixture is distributed, then being removed through an outlet line and recondensed before being recycled to the reactor.

Equipment according to the present invention can also be advantageously used in other parts of the urea synthesis process, for example, in the medium- or -low pressure carbamate decomposers, where the last traces of this compound are separated from the urea, molten or in solution, and sent back towards the reactor, or again, into the urea vacuum concentration section.

The drawings of the enclosed figures represent, in scale, some illustrative and non-limiting examples of embodiments according to the present invention and, for comparative purposes, with what is known in the art.

FIG. 1 schematically represents a perspective view of the longitudinal section of the tube bundle equipment according to the present invention, in particular suitable for use as high-pressure stripper for the decomposition of the carbamate in a plant for the synthesis of urea. For greater simplicity, only one tube of the bundle, surmounted by the relative ferrule, is represented.

FIG. 2 schematically represents the view of a longitudinal section of the terminal part of a bimetallic tube of the type described in the above-mentioned U.S. Pat. No. 4,899,813, comprising a thin internal layer of zirconium mechanically attached to a stainless steel cylindrical body, on which a ferrule of the traditional type is assembled, in a typical stripper used in the art for the separation of carbamate in the high-pressure cycle of the urea synthesis process.

Figure 3:
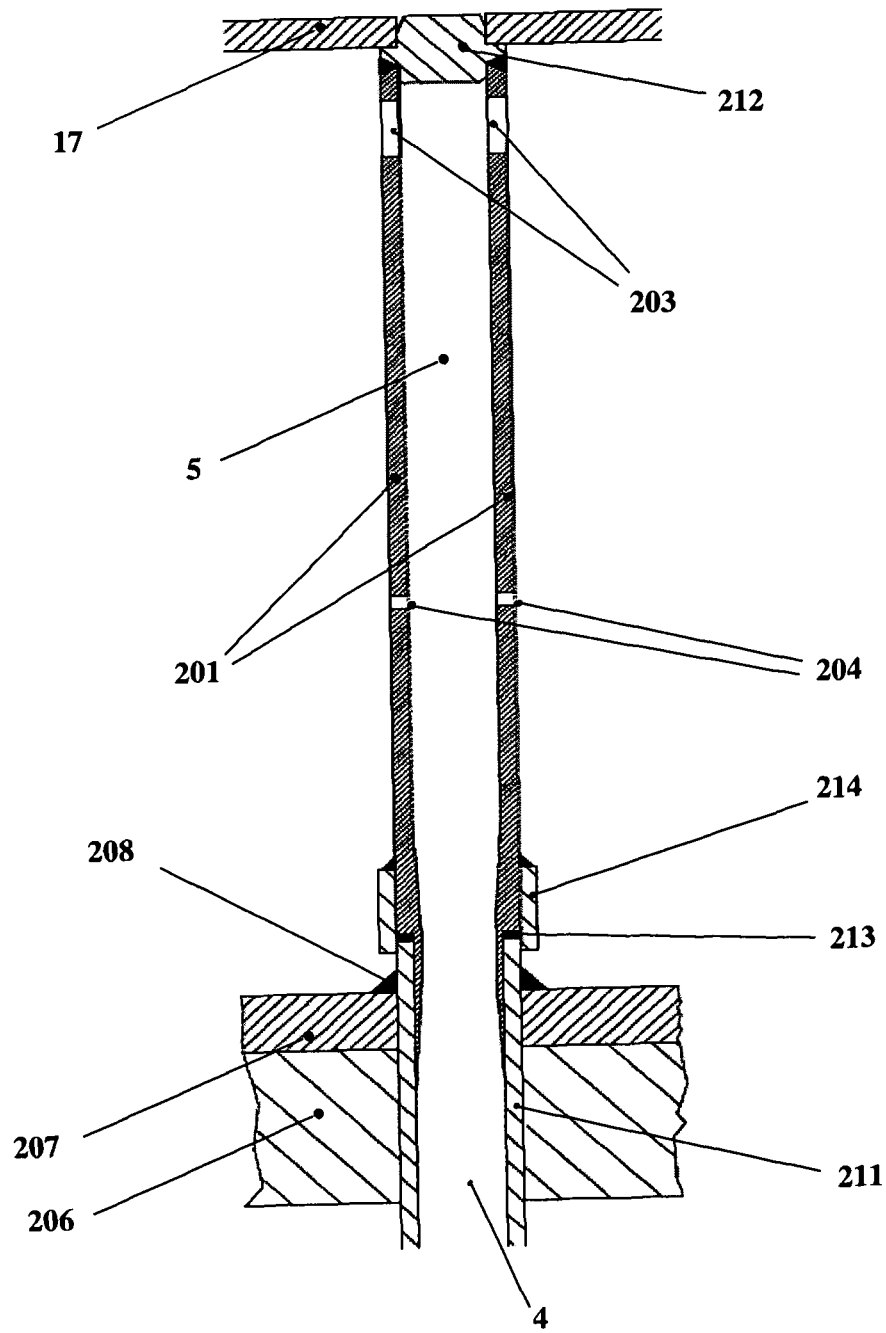

FIG. 3 schematically represents the view of a longitudinal section of the terminal region of the tube according to the present invention, as represented in the equipment of FIG. 1, comprising a ferrule assembled by interposition of a gasket.

Figure 4:
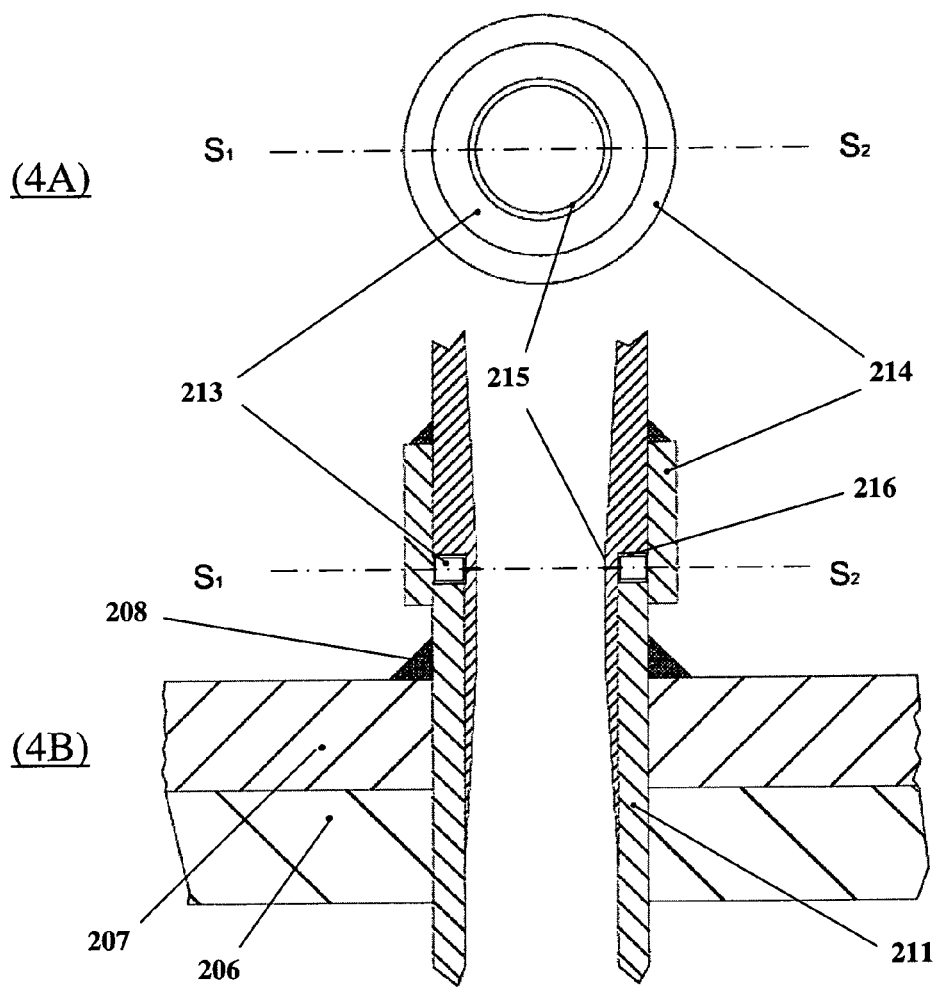

FIG. 4 schematically represents two views of an enlarged detail of the previous FIG. 3, represented according to the longitudinal section, in the view 3B, and according to the transversal section identified by the line $S_1$-$S_2$ in 3B, in the view 3A, in which the details of the coupling area of the ferrule itself in the terminal part of the vertical tube, can be distinguished.

Figure 5:
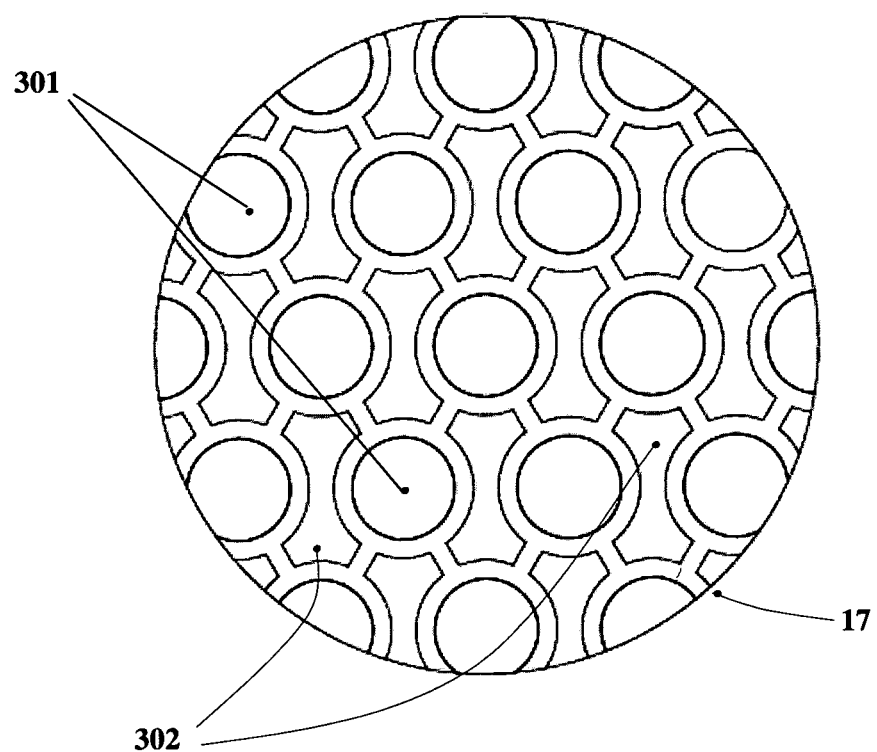

FIG. 5 schematically represents a view from above of a part of the grid used for fixing the ferrules in the equipment according to the present invention.

For greater simplicity and figurative clarity of the details, the proportions of the different elements which appear in the figures do not correspond to the actual proportions.

With reference to the above figures, a description follows of a non-limiting embodiment of the equipment according to the present invention, with particular reference to the stripper used in a plant for the synthesis of urea with stripping gas consisting of ammonia in strong excess (N/C ratio usually ranging from 3.0 to 3.6) present in the feedstock (so-called auto-stripping process).

FIG. 1 is a sectional view of a stripper positioned vertically, in which three hollow sections can be distinguished, the upper section 1, having a semispherical form, the intermediate section 3 which is cylindrical and the lower section 2 having a semispherical form. The diameter of the cylindrical section ranges from 1.5 to 2.5 m and the length ranges from 5 to 10 m. At the upper and lower ends of the equipment there are two manholes, 7 and 8 respectively, whereas sections 1 and 2 are seal-separated from section 3 by means of the two tube sheets 15 and 16, each carrying from 2,000 to 4,000 holes for the passage of the tubes 4. The rest of the wall of the two sections 1 and 2 is delimited by the force body 14.

The ferrule 5 can be distinguished in the upper section 1, assembled on the upper end of the tube 4, and kept in position by the grid 17. Upper holes 203 and intermediate tangential holes 204 are situated in the ferrule for the inlet of the liquid, which can be better distinguished in the subsequent FIGS. 3 and 4. The solution coming from the urea synthesis reactor, comprising urea, water, ammonia in excess and non-converted carbamate, is fed to the stripper by means of line 9, at a temperature of about 180-200° C. and a pressure of about 14-17 MPa. It is distributed by means of the toroid 13. The liquid drips through the grid 17, and is collected on the bottom of section 1, consisting of the surface of the tube sheet, until it reaches the level 21, slightly above the tangential holes 204, through which it drips inside the ferrule 5 and then into the tube 4, forming a thin layer not represented in FIG. 1, whereas vapours of ammonia and carbon dioxide which are released in the decomposition and stripping phase pass through the central part of the tube 4 in countercurrent. Said vapours are then discharged through the upper holes 203 of the ferrule and are sent towards the outlet line 10.

The whole internal surface of section 1 is coated with a corrosion-resistant metal, for example 25/22/2 Cr/Ni/Mo (urea grade), titanium or zirconium, having a thickness of 3 to 8 mm, not shown in FIG. 1.

The intermediate section of the equipment comprises the cylindrical chamber 3, delimited towards the outside by the wall 20 made of carbon steel, having a thickness usually ranging from 20 to 30 mm and crossed by the tube bundle, in which saturated vapour is fed through the inlet 19, at a pressure of about 2-3 MPa and a temperature of 200 to 240° C., which circulates outside the tubes 4 and condenses on the outer wall of the same transferring heat to the aqueous solution of urea and carbamate which is flowing inside. The condensed liquid of the exhausted vapour then exits from line 18. In this way, the carbamate is decomposed and the ammonia in excess vaporized, which also acts as stripping agent.

The lower section 2 is delimited by a force body 14 analogous to the section 1, and by the lower tube sheet 16. Also in this case, the whole surface of the head and tube sheet exposed to contact with the process fluid, comprises a coating, not shown in FIG. 1, consisting of a suitable metal or alloy with a high resistance to corrosion, selected from those previously mentioned. The solution of urea mainly purified of carbamate, is collected on the bottom of the section 2 and is pushed into the siphon 11 from which it proceeds towards the further purification and drying sections. Further ammonia can be introduced through the inlet 12, if necessary, or carbon dioxide according to an alternative technology, to favour the stripping. Passivation air, when required, is also introduced from the same inlet.

In the drawing of FIG. 2, the tube 111 surmounted by a ferrule 102 can be distinguished. The tube 111 is delimited by the cylindrical wall 109, consisting, for example, of stainless steel of the type AISI 316L (urea grade), INOX steel 25/22/2 Cr/Ni/Mo, inserted in the tube sheet 106, made of carbon steel, whose end is welded to the anticorrosive coating 107 by means of the welding 108. Inside the tube ill, a tubular jacket 110, made of zirconium, forms a layer with a high resistance to corrosion and erosion, mechanically attached to the wall 109 of the tube. As can be noted in FIG. 2, the terminal part of the protective layer has been removed, for a length varying in industrial applications from 30 to 100 mm, to allow the insertion of the lower section of the ferrule, which is processed so as to substantially maintain the same internal diameter as the tube, and has an "L" profile in correspondence with the support line on the upper end of the tube, thus creating a circular rest surface. The ferrule 102, delimited by the wall 101, made of stainless steel or titanium, has from 3 to 4 tangential holes 104 situated laterally on the wall at a height normally ranging from 20 to 50 mm with respect to the circular rest surface of the ferrule on the tube. The upper part of the ferrule is closed and maintained in position by the grid 105 by simply resting thereon. Two or three openings are situated in the ferrule, slightly below the top, with a diameter of about 20-25 mm, for the discharge of the gases. The internal diameter of the tube (including the coating 110) and, correspondingly, of the ferrule, is usually within the range of 10 to 40 mm in the high-pressure equipment (>10 MPa), and from 20 to 50 mm in medium- or low-pressure equipment (≤9 MPa).

With reference to FIG. 3, this illustrates the elements representing the equipment according to the present invention. The tube 4 of the exchanger represented in FIG. 1, is delimited by the cylindrical wall 209, represented herein with a single metallic layer, but which can also comprise, as already indicated, two or more layers of different metals or alloys. Said tube 4 is inserted in the tube sheet 206, usually made of carbon steel, coated by an anticorrosive metallic layer 207, by means of seal-welding 208, situated close to the upper end of the tube, so that the latter protrudes above the coating for a length ranging from 30 to 50 mm.

The tube 4 is surmounted by the ferrule 5, inserted in the inlet end of the same by means of the lower section 215, clearly visible in FIG. 4, which is processed so as to substantially maintain the same internal diameter as the tube, and form a right angle with the rest base 216 of the ferrule. The ferrule 5, delimited by the wall 201, made of stainless steel or titanium, has from 3 to 4 tangential holes 204 situated laterally on the wall at a height ranging from 50 to 100 mm with respect to said rest base 216.

Close to the circular rest base 216, a further metallic strip 214 is visible in FIG. 3, even more clearly in FIG. 4, protruding externally with respect to the main tubular element 201 of the ferrule, which extends for a length of 5 to 20 mm, downwards, beyond the horizontal circular surface of the same base 216. In the housing respectively delimited on three sides by said horizontal base, the protruding part of the strip 214, clearly visible in the enlarged section of FIG. 4 and by the vertical wall of the lower section 215, the gasket 213, made of PTFE, can be distinguished, which allows the ferrule to indirectly rest on the border of the upper end of each tube 211, at the same time preventing leakage of the liquid phase collected in the upper area of the exchanger.

The upper part of the ferrule is closed by means of the stopper 212 and kept in position by the grid 205, of which a detail is represented in a horizontal plan view, in the following FIG. 5. Two or more openings 203, having a diameter of about 10-20 mm, are situated in the ferrule, slightly below the top, for the discharge of the gases or vapours. The internal diameter of the tube and correspondingly of the upper part of the ferrule, is normally within the range of 10 to 30 mm in the high-pressure equipment (>10 MPa), and from 20 to 60 mm in medium- or low-pressure equipment (≤9 MPa).

Unlike what is represented in the previous FIG. 2, however, in the equipment according to the present invention, it is not necessary to effect any preliminary processing on the end of the tube 211 to adapt it to the insertion of the lower section 215 of the ferrule, as the satisfactory seal of the ferrule-tube assembly is ensured by the presence of the gasket, kept in a firm position by the presence of the outer strip 214.

The drawing of FIG. 5 schematically shows a view from above of a part of the grid 17, whose section is represented, with the same numerical reference, in FIGS. 1 and 3. In FIG. 5, a large number of circular holes 301 geometrically orderly, alternating with other openings 302 having an irregular form, can be distinguished. Each hole 301 is destined to house the upper terminal part of the ferrule, preferably the stopper 212 visible in FIG. 3, having a truncated-conical shape, a spherical segment or any other form suitable for favouring a stable insertion in the hole itself. The diameter of each hole 301 is therefore substantially the same as that of the ferrule or slightly lower. The openings 302, on the other hand, have the double function of allowing the vapours to flow towards the top of the head of the stripper exchanger, and allowing the dispersed liquid to drip from the distributor 13 of FIG. 1, which is collected on the surface of the tube sheet until it reaches the level 21.

Said grid can consist of any corrosion-resistant metal, such as, for example, aluminium, titanium, zirconium, stainless steel. It is generally obtained by cutting a sheet having a suitable thickness, according to the profile of the holes and openings which are to be obtained. A known cutting technique which is particularly suitable for the purpose is that by means of a high-pressure water jet (from 10 to 100 MPa), controlled by a computerized system.

Equipment according to that previously described with reference to FIGS. 1, 3, 4 and 5, has demonstrated a perfect sealing of the ferrules assembled on the tubes. After about one operating year under industrial regime conditions of a high-pressure stripper in a urea synthesis process (under auto-stripping conditions with ammonia), an inspection of the assembly area of the ferrule revealed the good preservation state, without evident deformation, of the gasket made of Teflon® and the absence of erosion paths due to infiltrations of liquid.

Embodiments of the present invention, different from those described above, can be effected by experts in the field adapting to the various applicative requirements, which form obvious variants, in any case included in the scope of the following claims.

The invention claimed is:

1. Tube-bundle equipment of the falling liquid film type, suitable for thermal exchange between fluids, comprising a vertical cylindrical body closed at the ends and divided into at least one upper section, an intermediate section and a lower section by means of two perforated tube sheets arranged transversally at a suitable distance from each other, wherein a plurality of tubes are arranged longitudinally forming a tube-bundle and seal-inserted with the respective ends in the holes of said tube sheets allowing said upper section and lower section of the cylindrical body to be in fluid communication with each other, each tube being surmounted, on the upper end, by a tubular device, also called ferrule, for the inlet and distribution of the liquid in the form of a film along the wall of the same, said tubular device comprising above one or more openings for the outlet of vapours, at an intermediate height one or more openings, for the inlet of the liquid and below, a circular base for holding on the upper end of said tube and a lower cylindrical section protruding downwards beyond the circular base, inserted in said tube for a length varying from 10 to 200 mm, characterized in that said ferrule comprises a further metallic strip arranged laterally with respect to the outside of said circular base and protruding beyond this for a length of at least 2 mm downwards, and in that, in the circular area defined between said outer metallic strip and said cylindrical section protruding downwards, there is a gasket, inserted between said circular base of the ferrule and said upper end of the tube; wherein said gasket has an annular shape with internal and external diameters substantially coinciding with those of the housing where it is positioned, and the gasket is kept in a firm position by the outer metallic strip.

2. The equipment according to the previous claim 1, wherein said tube has an internal diameter ranging from 5 to 150 mm and a thickness within the range of 1 to 20 mm.

3. The equipment according to one of the previous claim 1 or 2, wherein said tube comprises at least one internal layer in contact with the liquid film consisting of zirconium or an alloy thereof.

4. The equipment according to claim 1, wherein the upper border of said tubes of the tube-bundle protrudes for up to 80 mm beyond the plane of the tube sheet in which it is inserted.

5. The equipment according to claim 1, wherein the lower section of said ferrule has an outer diameter substantially coinciding, except for a tolerance of a few μm, with the internal diameter of the tube of the tube-bundle.

6. The equipment according to claim 1, wherein the lower section of the ferrule consists of a tubular sector having a length of 10 to 120 mm prolonged below beyond the border of the circular base, and a thickness within the range of 0.5 to 5 mm.

7. The equipment according to the previous claim 6, wherein the tubular part of the lower section of the ferrule is has a truncated-conical tapering in the lower terminal part, for a length of 5 to 50 mm.

8. The equipment according to claim 1, wherein the length of the ferrule ranges from 200 to 800 mm from the edge of the upper end to the border of the extension of the lower section inserted in the tube end.

9. The equipment according to claim 1, wherein said lower section of the ferrule is internally superimposed with respect to the tubular profile of the upper part of the ferrule, for a coaxial portion varying from 10 to 150 mm.

10. The equipment according to the previous claim 9, wherein, in said superimposed area, the internal diameter of the lower section progressively increase upwards, producing a truncated-conical profile for a length of 5 to 50 mm.

11. The equipment according to claim 1, wherein said circular outer strip of the ferrule protrudes downwards, beyond the border of the ring, for a length of 2 to 50 mm.

12. The equipment according to claim 1, wherein said gasket consists of at least one high-performance compressible material, selected from the group consisting of fluorinated polymers, silicon polymers, and analogous elastomeric materials, vulcanized or non-vulcanized, having a high chemical and heat resistance, noble malleable metals.

13. The equipment according to claim 12, wherein said gasket consists of polytetrafluoroethylene (PTFE).

14. The equipment according to claim 1, wherein said gasket has a quadrangular section and a thickness, in a vertical direction, ranging from 0.5 to 8 mm.

15. The equipment according to claim 1, wherein the height at which said tangential openings for the entry of the liquid are situated, ranges from 50 to 160 mm with respect to the circular base of the ferrule which rests on the tube.

16. The equipment according to claim 1, wherein said ferrule is closed at the upper end by means of a welded stopper or lid and has at least one side opening close to the upper end, for the outlet of the gases.

17. The equipment according to claim 1, wherein, a grid made of metallic material is wedge-inserted above said ferrules, comprising a series of cavities or holes in positions and with such a form as to be able to house the upper end of each of the ferrules.

18. The equipment according to claim 17, wherein said grid comprises further openings or holes for the passage of the gases towards the higher part of said upper section.

19. The equipment according to claim 1, wherein said metallic strip protrudes beyond said circular base for a length ranging from 3 to 50 mm downwards.

20. The equipment according to claim 2, wherein said tube has an internal diameter ranging from 10 to 100 mm, and a thickness within the range of 2 to 15 mm.

21. The equipment according to claim 1, wherein the upper border of said tubes of the tube-bundle protrudes for a length ranging from 10 to 50 mm beyond the plane of the tube sheet in which it is inserted.

22. The equipment according to claim 1, wherein the lower section of the ferrule consists of a tubular sector having a length of 20 to 80 mm, prolonged below beyond the border of the circular base, and a thickness within the range of 1 to 4 mm.

23. The equipment according to claim 1, wherein the length of the ferrule ranges from 300 to 600 mm, from the edge of the upper end to the border of the extension of the lower section inserted in the tube end.

24. The equipment according to claim 1, wherein said lower section of the ferrule is internally superimposed with respect to the tubular profile of the upper part of the ferrule, for a coaxial portion varying from 40 to 100 mm.

25. The equipment according to claim 1, wherein said circular outer strip of the ferrule protrudes downwards, beyond the border of the ring, for a length of 3 to 30 mm.

26. The equipment according to claim 1, wherein said gasket has a quadrangular section and a thickness, in a vertical direction, ranging from 1 to 5 mm.

27. Tube-bundle equipment of the falling liquid film type, suitable for thermal exchange between fluids, comprising a vertical cylindrical body closed at the ends and divided into at least one upper section, an intermediate section and a lower section by means of two perforated tube sheets arranged transversally at a suitable distance from each other, wherein a plurality of tubes are arranged longitudinally forming a tube-bundle and seal-inserted with the respective ends in the holes of said tube sheets allowing said upper section and lower section of the cylindrical body to be in fluid communication with each other, each tube being surmounted, on the upper end, by a tubular device, also called ferrule, for the inlet and distribution of the liquid in the form of a film along the wall of the same, said tubular device comprising above one or more openings for the outlet of vapours, at an intermediate height one or more openings for the inlet of the liquid and below, a circular base for holding on the upper end of said tube and a lower cylindrical section protruding downwards beyond the circular base, inserted in said tube for a length varying from 10 to 200 mm, characterized in that said ferrule comprises a further metallic strip arranged laterally with respect to the outside of said circular base and protruding beyond this for a length of at least 2 mm downwards, and in that, in the circular area defined between said outer metallic strip and said cylindrical section protruding downwards, there is a gasket, inserted between said circular base of the ferrule and said upper end of the tube; wherein said gasket has an annular shape with internal and external diameters substantially coinciding with those of the housing where it is positioned, and the gasket is kept in a firm position by the presence of the outer metallic strip; and wherein the outer metallic strip is in contact with respective outer lateral surfaces of both the ferrule and the tube.

* * * * *